(12) United States Patent
Kihara et al.

(10) Patent No.: US 7,437,723 B1
(45) Date of Patent: Oct. 14, 2008

(54) SYSTEM FOR MANAGING DISTRIBUTION OF PROGRAMS

(75) Inventors: Kenichi Kihara, Fujisawa (JP); Toshiaki Hirata, Kashiwa (JP); Katsuo Nakashima, Yokohama (JP); Kenichi Yoshida, Kitamoto (JP)

(73) Assignee: Hitachi, Ltd, Tokyo (JP)

( * ) Notice: Subject to any disclaimer, the term of this patent is extended or adjusted under 35 U.S.C. 154(b) by 296 days.

(21) Appl. No.: 09/652,924

(22) Filed: Aug. 31, 2000

(30) Foreign Application Priority Data

Dec. 15, 1999 (JP) ................................. 11-355462

(51) Int. Cl.
*G06F 9/44* (2006.01)
(52) U.S. Cl. ................... 717/172; 717/103; 717/124
(58) Field of Classification Search ............ 717/124, 717/100, 11, 4, 136, 168–178, 103; 709/221, 709/227; 703/23; 704/4; 707/10, 203; 718/106; 714/4

See application file for complete search history.

(56) References Cited

U.S. PATENT DOCUMENTS

| | | | | |
|---|---|---|---|---|
| 5,008,814 A | * | 4/1991 | Mathur ................... | 709/221 |
| 5,471,609 A | * | 11/1995 | Yudenfriend et al. ........... | 714/4 |
| 5,561,802 A | * | 10/1996 | Orimo et al. ................ | 717/136 |
| 5,742,829 A | * | 4/1998 | Davis et al. ................. | 717/178 |
| 5,835,911 A | * | 11/1998 | Nakagawa et al. ........... | 707/203 |
| 5,933,647 A | * | 8/1999 | Aronberg et al. ............ | 717/178 |
| 5,953,533 A | * | 9/1999 | Fink et al. ................. | 717/175 |
| 6,049,670 A | * | 4/2000 | Okada et al. ................ | 717/177 |
| 6,058,393 A | * | 5/2000 | Meier et al. ................ | 707/10 |
| 6,078,931 A | * | 6/2000 | Motoyama ................... | 707/203 |
| 6,083,281 A | * | 7/2000 | Diec et al. .................. | 717/128 |
| 6,098,111 A | | 8/2000 | Maegawa et al. ........... | 709/300 |
| 6,138,153 A | * | 10/2000 | Collins et al. ............... | 709/221 |
| 6,226,784 B1 | * | 5/2001 | Holmes et al. .............. | 717/100 |

(Continued)

FOREIGN PATENT DOCUMENTS

JP 06-012348 1/1994

(Continued)

OTHER PUBLICATIONS

Yau et al., An approach to distributed component-based real-time application software development, IEEE, Apr. 1998, pp. 275-283.*

(Continued)

*Primary Examiner*—Wei Y. Zhen
*Assistant Examiner*—Satish S Rampuria
(74) *Attorney, Agent, or Firm*—Sofer & Haroun, LLP

(57) ABSTRACT

In an environment in which programs are executed on a plurality of computers connected to a network, a program distribution managing system facilitates, when a reference relationship exists between programs on mutually different execution computers, management for distribution and deletion of applications. The system includes a distribution information supplier to supply information indicating a status of distribution of a program to be executed on either one of the computers, a reference information supplier to supply information concerning a type of the execution program as a reference destination of the program, and a reference destination managing section to acquire a location to which the execution program as a reference destination of the execution program is distributed according to information from the distribution information supplier and information from the reference information supplier.

1 Claim, 13 Drawing Sheets

U.S. PATENT DOCUMENTS

| | | | |
|---|---|---|---|
| 6,282,712 B1 * | 8/2001 | Davis et al. | 717/170 |
| 6,298,480 B1 * | 10/2001 | Beuk et al. | 717/171 |
| 6,347,398 B1 * | 2/2002 | Parthasarathy et al. | 717/178 |
| 6,381,742 B2 * | 4/2002 | Forbes et al. | 717/176 |
| 6,397,378 B1 * | 5/2002 | Grey et al. | 717/175 |
| 6,502,238 B1 * | 12/2002 | Pavan et al. | 717/149 |
| 6,532,588 B1 * | 3/2003 | Porter | 717/170 |
| 6,606,744 B1 * | 8/2003 | Mikurak | 717/174 |
| 6,629,123 B1 * | 9/2003 | Hunt | 718/106 |
| 6,691,165 B1 * | 2/2004 | Bruck et al. | 709/227 |
| 2001/0004766 A1 * | 6/2001 | Koyama | 717/4 |
| 2002/0002704 A1 * | 1/2002 | Davis et al. | 717/11 |

FOREIGN PATENT DOCUMENTS

| | | |
|---|---|---|
| JP | 9293010 | 9/1997 |
| JP | 9223031 | 11/1997 |
| JP | 10-083280 | 3/1998 |

OTHER PUBLICATIONS

Pant et al., Software reliability predictions for distributed software, IEEE, Nov. 1998, pp. 11-21.*

Satoh et al., Experiment of component-based software development on multiple distributed object environments, IEEE, 1998, pp. 12-19.*

* cited by examiner

FIG. 4

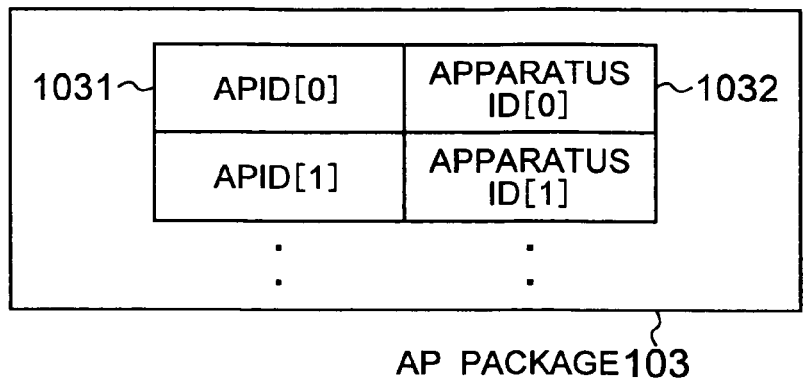

FIG. 5

| 1041 | 1042 | 1043 | 1044 |
|---|---|---|---|
| REFERENCE SOURCE APPARATUS ID[0] | REFERENCE SOURCE APID[0] | REFERECE DESTINATION APPARATUS ID[0] | REFERENCE DESTINATION APID[0] |
| No. OF REFERENCE DESTINATIONS [0] | NATIFICATION NECESSITY/ NON-NECESSITY [0] | INITIAL REFERENCE ACTION[0] ||
| 1045 | 1046 | 1047 ||
| REFERENCE SOURCE APPARATUS ID[1] | REFERENCE SOURCE APID[1] | REFERECE DESTINATION APPARATUS ID[1] | REFERENCE DESTINATION APID[1] |
| No. OF REFERENCE DESTINATIONS [1] | NATIFICATION NECESSITY/ NON-NECESSITY [1] | INITIAL REFERENCE ACTION[1] ||

REFERENCE STATUS TABLE 104

[INQUIRY]

| INQUIRY | APPARATUS ID | APID | REFERENCE DESTINATION APID |
|---|---|---|---|
| 341 | 342 | 343 | 344 |

34

[REPLY]

| REPLY | REFERENCE DESTINATION APPARATUS ID |
|---|---|
| 351 | 352 |

| AP REGISTRATION |
|---|

9101 — DELIVERY ITEM : APPa

9102 — DELIVERY DESTINATION :
- PCa
- PCb
- PCc
- PCd
- PCe
- PCf
- PCg

[ OK ]  [ CANCEL ]

FIG. 15

SELECTION OF REFERENCE DESTINATION OF AP : APPa

APPARATUS ID TO BE REMAINED
- PCa

< ADD
DELETE >

APPARATUS ID TO BE DELETED
- PCb
- PCc
- PCd

[ OK ]  [ CANCEL ]

FIG. 16

| AP DELETION |
|---|

SELECT COMBINATION OF APID AND APPARATUS ID FOR DELETION

| APID | APPARATUS ID |
|---|---|
| APPa | PCa |
| APPb | |
| APPc | PCf |
| APPd | PCd |
| APPe | PCb |

[ OK ]   [ CANCEL ]

FIG. 17

| DISPLAY OF REFERENCE RELATIONSHIP : APPa(PCa) |
|---|

APPf(PCe)
APPb(PCe)
    APPd(PCd)
        APPc(PCf)
        APPe(PCb)

9401

[ OK ]   [ CANCEL ]

FIG. 18

| | DISPLAY OF REFERENCE RELATIONSHIP : APPa(PCa) | | | | |
|---|---|---|---|---|---|

APPa(PCa)
├─APPf(PCe)
└─APPb(PCe)
     └─APPd(PCd)
        ├─APPe(PCf)
        └─APPe(PCb)

9503

9501

[REFERENCED]

| APID | APPARATUS ID | NUMBER | NOTIFICATION | INITIAL REFERENCE ACTION |
|---|---|---|---|---|
| APPe | PCa | 1 | REQUIRED | — |
| APPe | PCb | 1 | REQUIRED | |

[REFERENCE]

| APID | APPARATUS ID | NUMBER | NOTIFICATION | INITIAL REFERENCE ACTION |
|---|---|---|---|---|
| APPb | PCe | 1 | REQUIRED | — |
| APPg | — | 1 | REQUIRED | EXECUTE DELIVERY, PACKAGE |

9502

SYSTEM FOR MANAGING DISTRIBUTION OF PROGRAMS

CROSS-REFERENCE TO RELATED APPLICATION

This application claims priority from Japanese Patent Application Reference No. 11-355462, filed Dec. 15, 1999, the entire content of which is incorporated herein by reference for all purposes.

BACKGROUND OF THE INVENTION

The present invention relates to a network, and in particular, to a method of distributing or delivering software to computer or apparatuses.

In an environment using a large number of computers, since manual installation of programs (execution programs, applications, or APs) to be executed on such computers becomes quite complex, a function to distribute or to deliver software via a network is employed as described in JP-A-6-12348. A software delivery function of this type helps deliver and install applications to many computers at once and hence the manual operation becomes less complex.

The applications are classified into two groups: applications each operating alone and applications each operating in cooperation with other applications. For example, under a condition that application B is necessary to execute application A, when only application A is installed, application A cannot operate if application B is absent. Paying attention to this fact, JP-A-10-83280 describes delivery of applications according to an application dependency relationship. In this technique, information of dependency of application A upon application B is first defined. At delivery of application A, the information of the dependency is referred to such that application B related in dependency to application A is also delivered.

As already described above, there exists a situation in which an application is required to execute another application.

The configuration of operation above is further classified into two cases: the pertinent application and a plurality of applications on which the pertinent application is dependent operate on one computer (one apparatus or one operating apparatus) or on mutually different computers. For example, in a client-server program, a client program is dependent on a server program, namely, a client program cannot operate alone.

For the dependency relationship between applications on mutually different apparatuses, there arise two problems as follows.

(1) Problem at Delivery and Installation of Application

When application A dependent on another application B is to be installed, it is necessary in some cases to input an identifier of a apparatus on which application B is installed. For example, in a case of a database application, to install a database client, it is required to beforehand input an identifier of a apparatus in which a database server exists. In such a situation, the apparatus identifier is necessary for the following reason. Although it has been already determined that the database client depends on the database server, there exists no information to link the database client and server with each other.

Additionally, application A depending on application B can be installed only after an installation destination is determined for application B. If the installation destination of application B has been determined, the installation destination can be specified even before installation of application B. However, this will be manually carried out, and some mistakes may possibly occur.

(2) Problem at Deletion of Application

Assume that application A depends on another application B and application B operates on apparatus 1. Assume that application B is to be deleted or uninstalled from apparatus 1 while application A is operating in other apparatuses. To beforehand determine influence of the deletion of application B, the use must achieve jobs as follows. First, a human manager (of the application) checks the applications which depend on application B to recognize that application A depends on application B. The manager must further determine apparatuses on which application exists. If it is found that another application C depends on application A, the manager must similarly check application C. To manually achieve these jobs, a large amount of human power and a long period of time will be required for complex work.

Assume in a situation in which application B is operating on apparatus 1 and application A dependent on application B is operating on another apparatus 2 that it is desired to change the operating apparatus of application B from apparatus 1 to apparatus 2. Complex operation similar to that described above is required to determine influence of this operation. There is further required an operation to change the operating apparatus from apparatus 1 to apparatus 2. This results in complex human work.

The method of JP-A-10-83280 defines a dependency relationship in each apparatus to execute processing according to the dependency relationship. However, problems concerning dependency relationships between applications associated with mutually different operating apparatuses cannot be solved.

SUMMARY OF THE INVENTION

It is therefore an object of the present invention to provide a technique for use in a situation in which applications on different apparatuses have a dependency relationship, to lessen complexity of management or control for delivery and deletion of the applications.

In accordance with the present invention, there is provided a processing section to manage or to control a reference status between applications on different operating apparatuses.

Specifically, in accordance with the present invention, there is provided a processing section which defines a dependency relationship between applications in the form of data and which supplies information concerning a reference status of the dependency relationship and information concerning a delivery status of applications and a management or control section which instructs, using the reference status supply section and the delivery status supply section, delivery and deletion of an application, update of a reference destination of an application, and the like.

In accordance with the present invention, there is provided an application executing section including a function to execute an application, a function to receive an instruction from the application reference management section, a function to receive the application delivered, a function to install the application delivered, a function to delete or uninstall the application beforehand installed, and a function to notify a reference destination of the application to another application.

Each of the processing sections is generally implemented as a program (a code or a module) loaded in a memory of a computer to be executed by a central processing unit (CPU) thereof. These programs are introduced from other computers via a computer readable medium embodying the respective programs such as a signal transmitted via a network, a compact disk read-only memory (CDROM), or a floppy disk (FD).

These and other benefits are described throughout the present specification. A further understanding of the nature and advantage of the invention may be realized by reference to the remaining portions of the specification and the attached drawings.

BRIEF DESCRIPTION OF THE DRAWINGS

FIG. 4 is a diagram showing a data layout of a delivery status table;

FIG. 5 is a diagram showing a data layout of a reference status table;

FIG. 14 is a diagram showing an example of an application registration screen;

FIG. 15 is a diagram showing an example of a screen to select a reference destination;

FIG. 16 is a diagram showing an example of a screen to select an application to be deleted;

FIG. 17 is a diagram showing an example of a screen to display a reference relationship; and FIG. 18 is a diagram showing another example of a screen to display a reference relationship.

DESCRIPTION OF THE EMBODIMENTS

Figure 1:
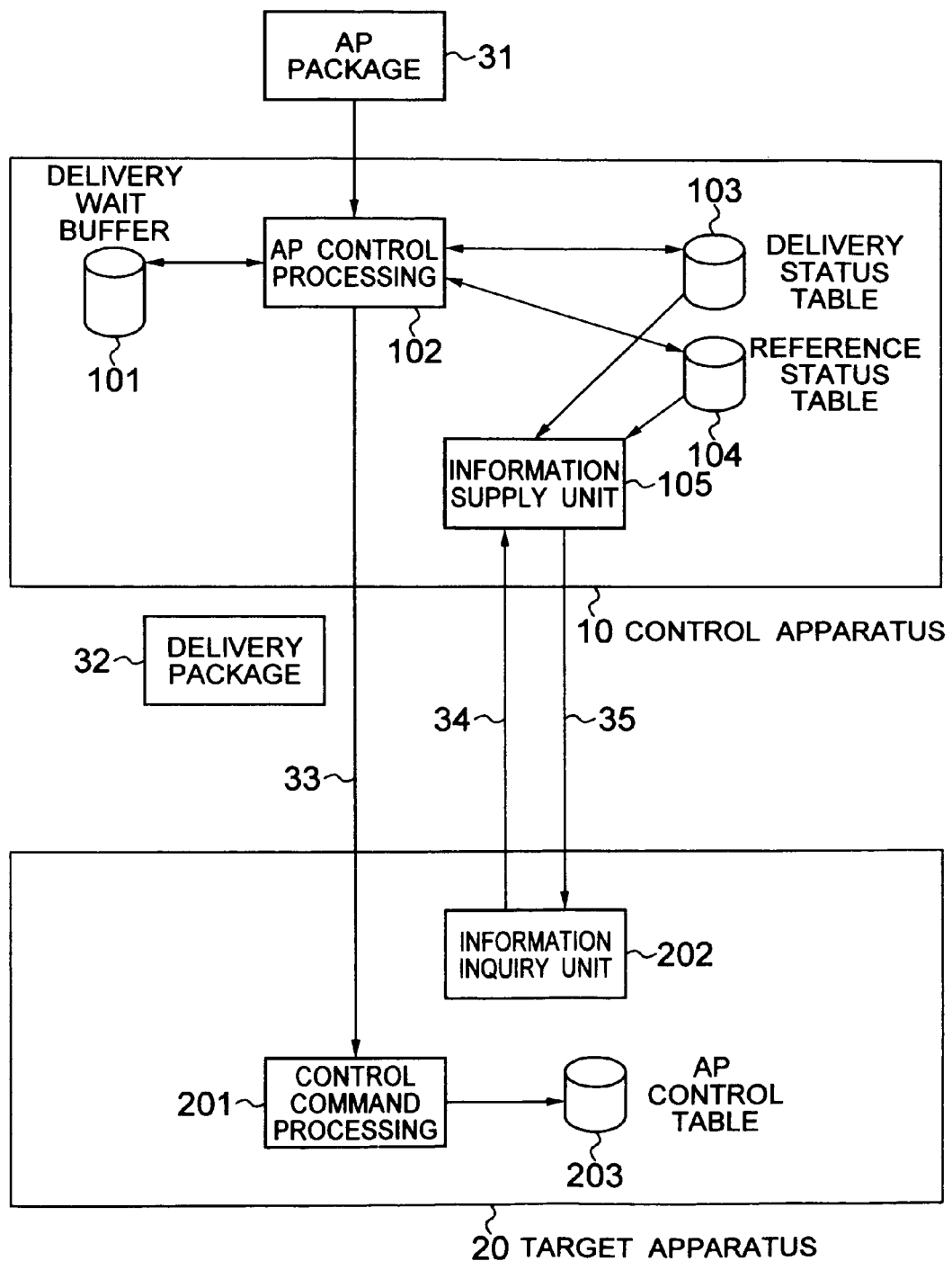
FIG. 1 is a diagram showing a system configuration of an embodiment of a system for managing distribution of programs in accordance with the present invention.

FIG. 1 shows a system configuration of an embodiment of a system for managing distribution of programs in accordance with the present invention. This system mainly includes two sections, i.e., a controller apparatus 10 and a target apparatus 20.

This embodiment includes a processing section which automatically determines a reference destination of an application according to a dependency relationship between applications. To notify a content thus automatically determined to target apparatus 20, this embodiment supports three methods as follows.

First, before controller apparatus 10 delivers an application to target apparatus 20, a reference destination of the application is determined. Information of the reference destination is sent together with the application to target apparatus 20. This method will be referred to as "static" herebelow.

Second, target apparatus 20 accesses an information supply section 105 to attain information of the reference destination. This method will be referred to as "download" herebelow.

Third, after an application is delivered, controller apparatus 10 notifies reference information to target apparatus 20. This method will be referred to as "notification" herebelow.

To embody the present invention, it is not necessarily required to use all of these three methods. Namely, only required ones thereof are to be used.

It is assumed in this embodiment that a manager to distribute or to deliver applications, namely, a distribution or delivery manager instructs execution of processing. During the application management processing, when a situation to select a processing content takes place, the delivery manager is asked for confirmation as necessary. However, if intervention of the delivery manager is not required because, for example, the processing content to be selected is fixed, the processing part to ask the delivery manage for confirmation can be dispensed with.

Controller apparatus 10 controls delivery of an application to target apparatus 20 and a reference relationship of applications on target apparatus 20. Target apparatus 20 is primarily used to execute applications and hence has a function to install an application, a function to set reference destinations of the application, and a function to uninstall the application.

Figure 2:
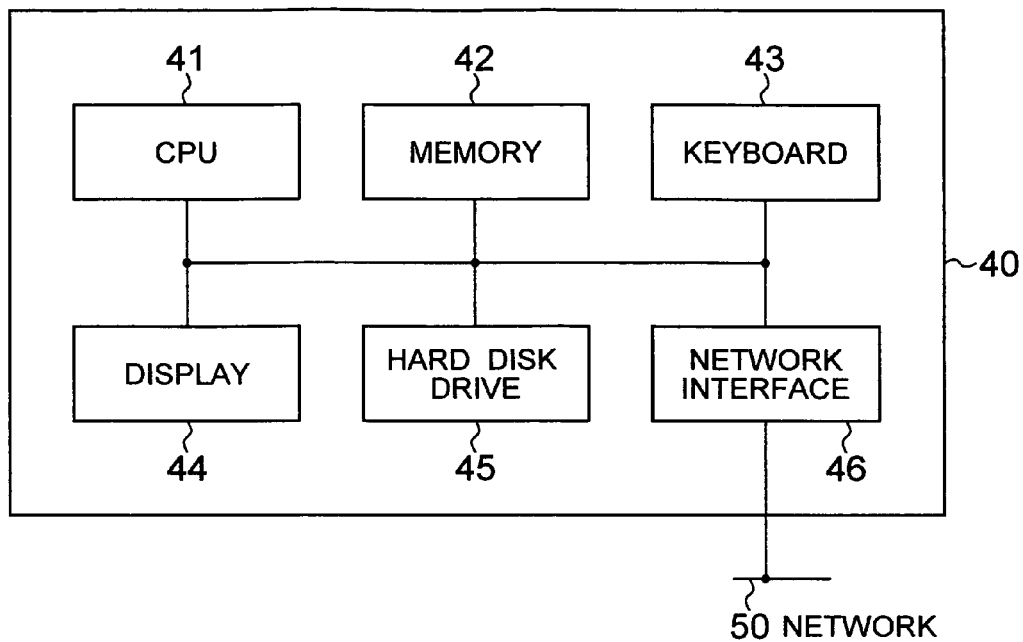
FIG. 2 is a block diagram showing a hardware configuration of each of a controller apparatus and a target apparatus shown in FIG. 1.

FIG. 2 shows an example of a hardware configuration 40 of each of controller apparatus 10 and target apparatus 20. The configuration includes hardware components such as a CPU 41, a memory 42, a keyboard 43, a display 44, a hard disk drive 45, and a network interface 46. Controller apparatus 10 and target apparatus 20 are linked with each other via a network 50 to communicate data therebetween.

Description will now be given in detail of controller apparatus 10 and target apparatus 20.

1. Controller Apparatus 10

Controller apparatus 10 includes a delivery status table 103, a reference status table 104, and a delivery wait buffer 101. In the hardware 40 of FIG. 2, controller apparatus 10 further includes an application control section 102 and an information supply section 105 which are implemented when CPU 41 executes associated programs stored in memory 42. Controller apparatus 10 constructed as above processes an application package 31 defining contents of applications and a delivery package 32 including a content of delivery of an application to target apparatus 20. Each constituent element will next be described.

Delivery status table 103 has a function to keep a list of applications delivered to target apparatus 20. Each entry of table 103 may be a pair of an application identifier (AP ID) 1031 and a apparatus identifier (ID) 1032. Application identifier 1031 is a name to discriminate the pertinent application from another types of application and to uniquely identify the pertinent application. Apparatus identifier 1032 is a name to uniquely identify pertinent target apparatus 20 and may be a host name thereof.

Reference status table 104 keeps information of a reference status between applications. As can be seen from FIG. 5, table 104 is a list including a combination (record) of a reference source apparatus identifier 1041, a reference source application identifier 1042, a reference destination apparatus identifier 1043, a reference destination application identifier 1044, a number of reference destinations 1045, notification necessity/non-necessity 1056, and an initial reference action 1047.

Reference source apparatus ID 1041 contains an identifier of target apparatus 20 on which an application making a reference exists. Reference source apparatus AP ID 1042 contains an identifier of an application making a reference. Reference destination apparatus ID 1043 contains an identifier of target apparatus 20 on which an application as a destination of reference exists. Reference destination apparatus AP ID 1044 contains an identifier of an application to which a reference is made. Number of reference destinations 1045 contains a value specifying the maximum allowable number of apparatus identifiers of reference destinations. Notification necessity/non-necessity 1046 specified whether or not, when the content of reference destination apparatus ID is changed, the event of change is to be notified to reference source target apparatus 20. Initial reference action 1047 defines processing to be executed when the reference destination is determined.

Delivery wait buffer 101 keeps delivery package 32 of applications not immediately delivered for some reasons such as an undetermined reference destination.

Figure 3:
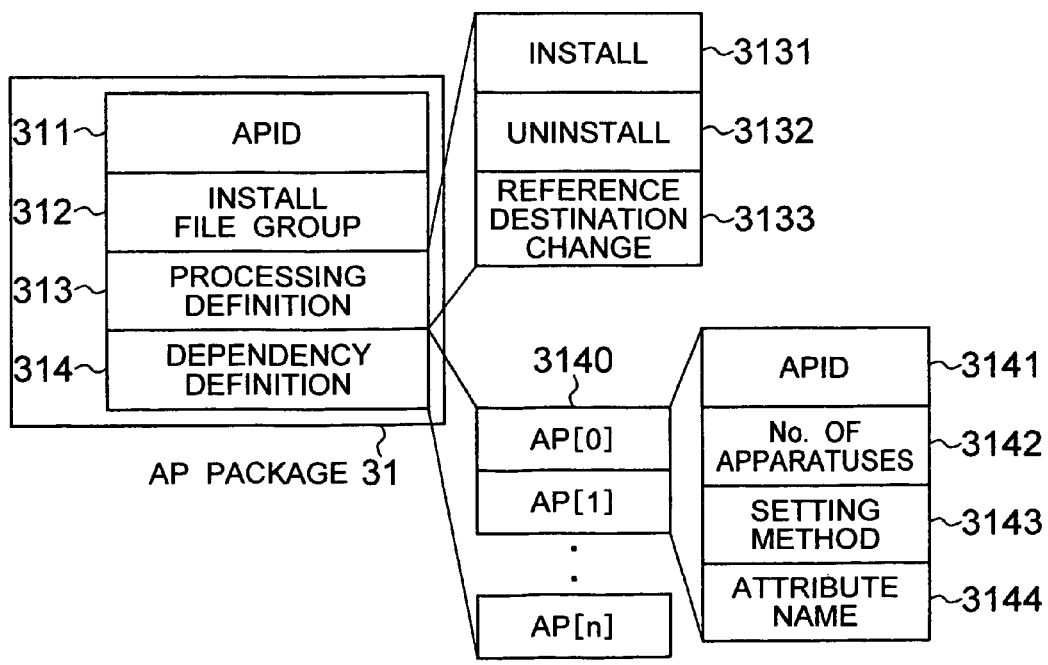
FIG. 3 is a diagram showing a data layout of an application package.

Application package 31 includes information unique to applications such as information of installation/uninstallation of an application and a method of setting a reference destination. FIG. 3 shows an example of a data layout of application package 31. The layout includes an AP ID 311, an installation file group 312, a processing definition 313, and a dependency relationship definition 314. AP ID 311 indicates an identifier name to discriminate the pertinent application from other applications. Installation file group 312 indicates a group of files, for example, a file necessary to install or to uninstall an application and a file necessary to execute a program. Processing definition 313 indicates procedures such as a procedure to install or to uninstall an application and a procedure to set a reference destination. Processing definition 313 includes an installation field 3131, an uninstallation field 3132, and a reference destination change field 3133. Install 3131 and uninstall 3132 each specify names of respective processing programs. Reference destination 3133 defines a method of notifying a change of the reference destination to the pertinent application.

Dependency relationship definition 314 defines an AP ID 3141, a number of apparatuses 3142, a setting method 3143, and an attribute name 3144 necessary for the pertinent application. Number of apparatuses 3142 defines the number of apparatuses available for reference, for example, "only one apparatus" or "a plurality of apparatuses". Setting method 3143 defines a method of acquiring information of the reference destination, namely, "static", "download", "notification", or either one of combinations thereof. Attribute name 3144 defines an identifier name of a storage destination for information of the reference destination. For example, when the application is of a type which describes a particular property name as a reference destination in a definition file unique to the application to notify the reference destination to the associated application, a file name of the definition file and a property name are specified in attribute name 3144.

Figure 6:
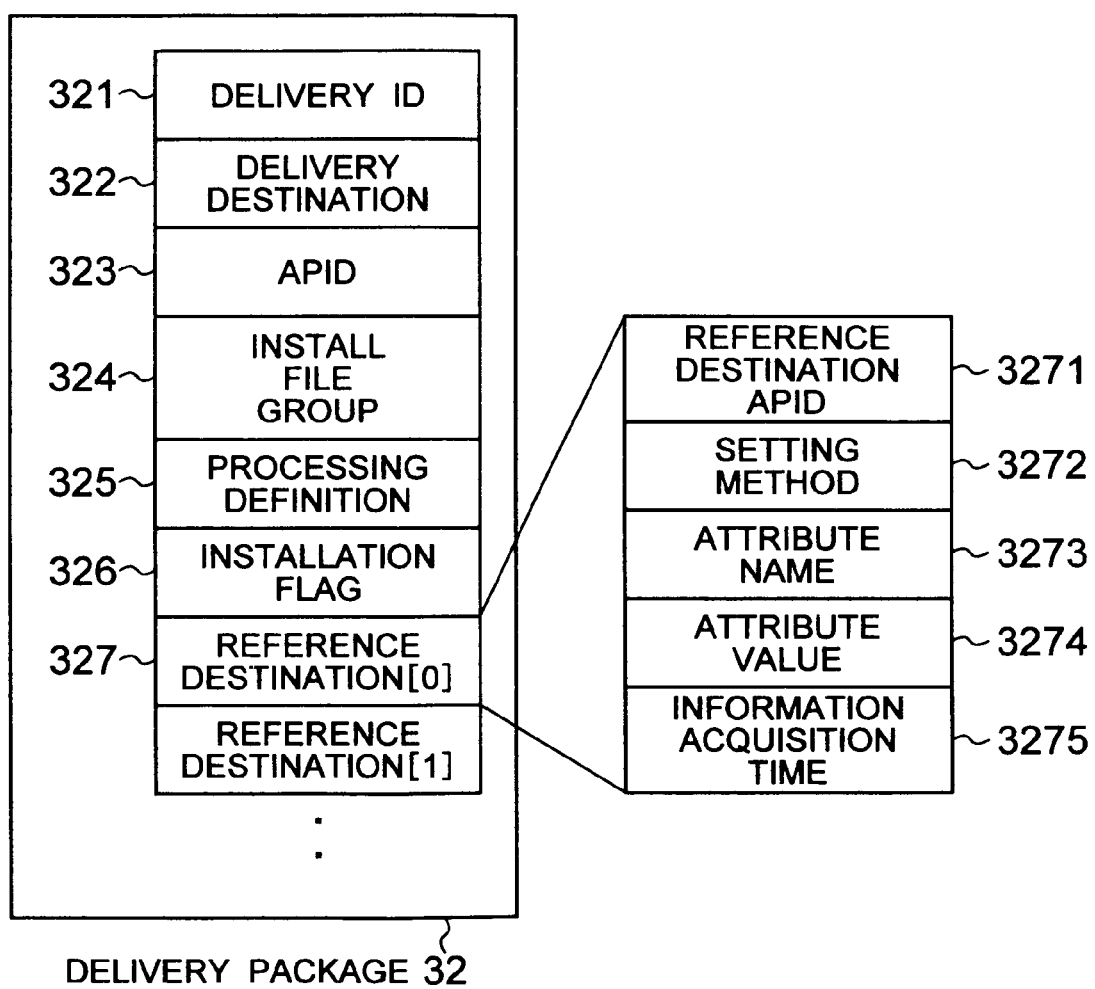
FIG. 6 is a diagram showing a data layout of a delivery package.

As shown in FIG. 6, delivery package 32 is a list including a delivery ID 321, a delivery destination 322, an AP ID 323, an installation file group 324, a processing definition 325, an installation flag 326, and a reference destination 327. Delivery ID 321 is an identifier name of delivery package 32 and is used to discriminate this packager 32 from other delivery packages 32. Delivery destination 322 specifies an identifier of target apparatus 20 as the delivery destination of delivery package 32. AP ID 323, installation file group 324, and processing definition 327 are the same as those of the associated items of application package 31. Installation flag 326 defines information to indicate whether or not, after delivery of an application to target apparatus 20, the application is to be installed. The list of reference destination 327 includes definitions of methods of notifying reference destinations to respective applications. The list may includes only one reference destination 327. Specified for each reference destination 327 are a reference destination AP ID 3271, a setting method 3272 ("static", "download", "notification", or a combinations thereof), an attribute name 3273 (an identifier name of information to notify the reference destination to an associated application), an attribute value (a apparatus identifier of the reference destination) 3274, and information acquiring timing 3275 (at apparatus initiation, at application initiation, at a fixed interval, or a combination thereof to acquire information of the reference destination by "download").

Application control processing 102 has four functions to register an application, to delete an application, to display a reference status, and to supply information of a reference destination. Each of the functions will be described.

(1) Application Registration

An application is generally registered as follows. According to the contents of application package 31 in which the contents of respective applications to be executed on target apparatus 20 are defined, the system refers to delivery status table 103 and reference status table 104 on controller apparatus 10 and delivers the applications to target apparatus 20 or stores the contents of delivery (delivery package 32) in delivery wait buffer 101.

Figure 10:
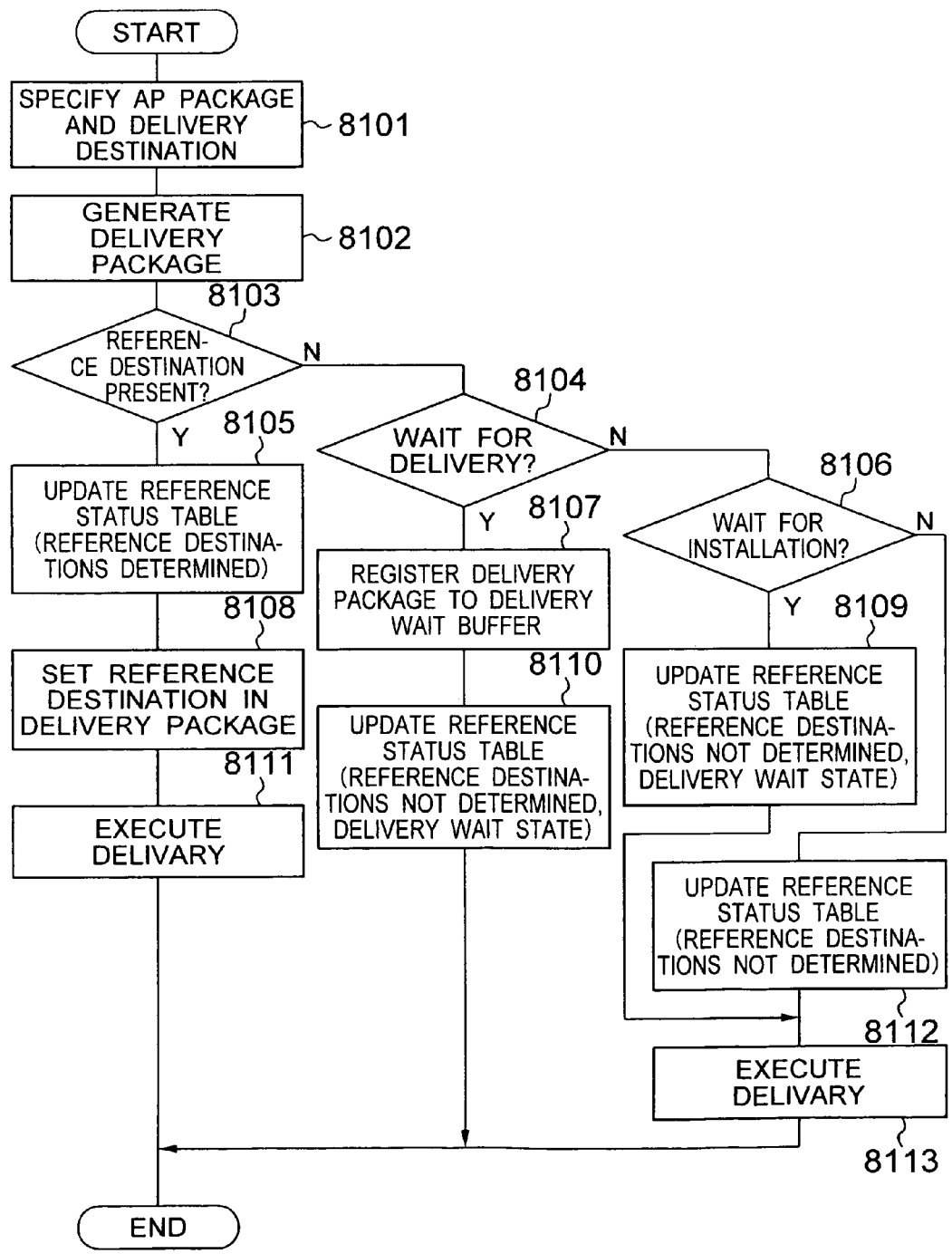
FIG. 10 is a flowchart showing an operation procedure of application registration.

The application registration will be described in detail by referring to a processing flow shown in FIG. 10.

Step 8101

The delivery manager specifies application package 311 as a processing object and target apparatus 20 as a destination of delivery. In this operation, a user interface screen is displayed, for example, as shown in FIG. 14. The manager need only input an identifier of application package 31 as delivery item 9101 and select target apparatus 20 as delivery destination 9102.

Step 8102

The system generates delivery package 32 according to application package 32 specified by the manager. Onto AP ID 323, installation file group 324, and processing 325 of delivery package 32, information items of the associated fields of application package 31 are copied. Delivery destination 322 of delivery package 32 is filled with the information specified by the manager. Attribute name 3142 and setting method 3143 of dependency relationship definition 314 of application package 31 are copied respectively onto the associated fields of delivery package 32. Installation flag 326 of delivery package 32 is set to one (for installation).

Step 8103

The system searches for a reference destination. That is, whether or not another application described in the dependency relationship definition of application package 32 has already been delivered to target apparatus 20 is determined by referring to delivery status table 103. If the application has already been delivered, the system issues a request to the manager to determine whether or not the delivery destination can be set as the reference destination.

Step 8105

When the manager selects "the delivery destination can be set as the reference destination", the system adds one record to reference status table 104. The record to be added includes the application delivery destination in reference source apparatus ID 1041, a apparatus ID of the reference destination in reference destination apparatus ID 1043, an identifier of reference destination application in reference destination AP ID 1044, number of apparatuses 3142 for the application in application package 31 in number of reference destinations 1045, and space in initial reference action 1047. When setting method 3143 of application package 31 contains "notification", "necessary" is set to notification necessity/non-necessity 1046. Otherwise, "non-necessity" is set thereto.

Step 8108

The apparatus identifier of the reference destination is set to the attribute value in the attribute definition of delivery package 32.

Step 8111

Delivery package 32 is delivered and the processing is terminated.

Step 8104

If the delivery package has not been delivered to any destination, the system issues a request to the delivery manager to determine whether or not the delivery package waits for delivery, namely, whether or not the delivery of the application in process is reserved until the reference destination application is delivered.

Step 8107

When the delivery manager selects "wait for delivery", delivery package 32 is registered to delivery wait buffer 101.

Step 8110

One record is added to reference status table 104. The record includes the application delivery destination in reference source apparatus ID 1041, the application identifier in reference source AP ID 1042, space in reference destination apparatus ID 1043, an identifier of the reference destination application in reference destination APID 1044, number of apparatuses 3142 for the application in the application package in number of reference destinations 1045, and "deliver delivery package 32 (currently in process) in the delivery buffer" in initial reference action 1047. When setting method 3143 of application package 31 contains "notification", "necessary" is set to notification necessity/non-necessity 1046. Otherwise, "non-necessity" is set thereto. The system sets the apparatus identifier of the reference destination to the attribute value in the attribute definition of delivery package 32, delivers delivery package 32, and then terminates the processing.

Step 8106

When the delivery manager selects "do not wait for delivery", the system issues a request to the manager to determine whether or not the manager waits for installation.

Step 8109

When the manager selects "wait for installation" in step 8106, one record is added to reference status table 104. The record includes the application delivery destination in reference source apparatus ID 1041, the application identifier in reference source APID 1042, space in reference destination apparatus ID 1043, the identifier of the reference destination application in reference destination APID 1044, number of apparatuses for the application of the application package in number of reference destinations 1045, and "install the delivery application (an application, currently in process, identified by the application identifier in delivery package 32) in the delivery destination" in initial reference action 1047.

When setting method 3143 of application package 31 contains "notification", "necessary" is set to notification necessity/non-necessity 1046. Otherwise, "non-necessity" is set thereto. The system sets the apparatus identifier of the reference destination to the attribute value in the attribute definition of delivery package 32.

Step 8112

When the manager selects "do not wait for installation" in step 8106, one record is added to reference status table 104. The record includes the application delivery destination in reference source apparatus ID 1041, the application identifier in reference source APID 1042, space in reference destination apparatus ID 1043, the identifier of the reference destination application in reference destination APID 1044, number of apparatuses for the application of the application package in number of reference destinations 1045, and space in initial reference action 1047. When setting method 3143 of application package 31 contains "notification", "necessary" is set to notification necessity/non-necessity 1046. Otherwise, "non-necessity" is set thereto.

Step 8113

The system delivers delivery package 32 and terminates the processing.

Figures 7, 8A, 8B:
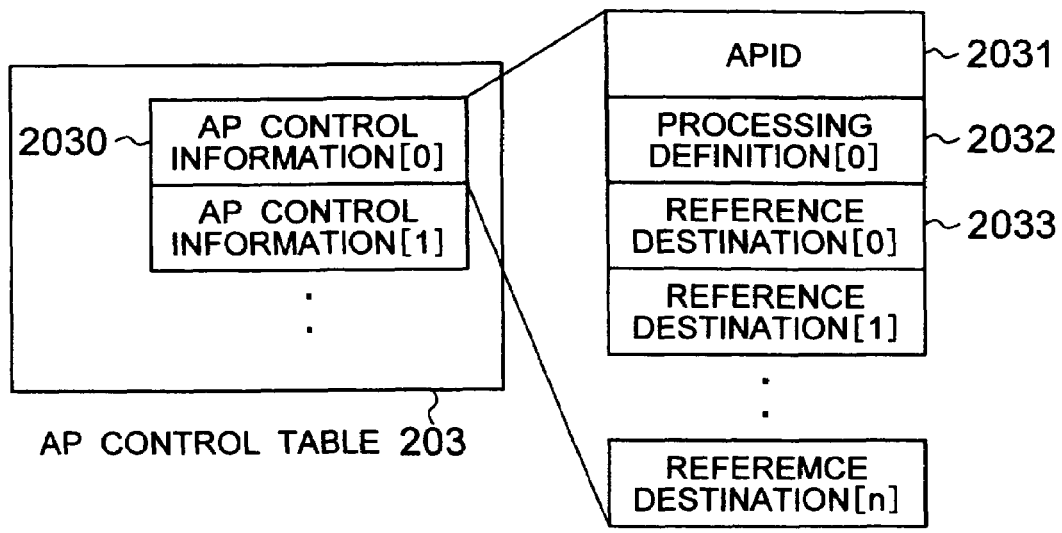
FIG. 7 is a diagram showing a layout of an application control table.
FIGS. 8A and 8B are diagrams showing data layouts for a reference registration inquiry and a reply thereto.

Although not described in the flowchart, if a plurality of reference destination applications exist, the processing is repeatedly executed for each reference destination application beginning at the determination of presence or absence of the reference destination in FIGS. 8A and 8B.

Description will now be given of the contents of delivery of delivery package 32.

Figure 9A:
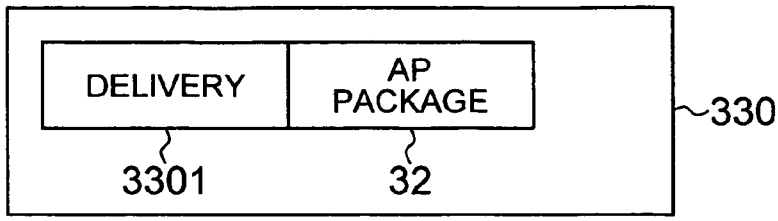
FIGS. 9A to 9D are diagrams showing data layouts for processing commands.

First, a delivery instruction for delivery package 32 is issued to target apparatus 20. The instruction includes two items: delivery command identifier 3301 and delivery package 32 as shown in FIG. 9A.

One record is added to delivery status table 103. The record includes the application identifier of delivery package 32 in AP ID 1031 and the apparatus identifier of delivery package 32 in apparatus ID 1032.

The system retrieves from reference status table 104 a record (of which "reference destination application" is the application identifier currently in process) which refers to the application just being delivered.

If such a record is missing, the system takes no action and returns control.

Figure 11:
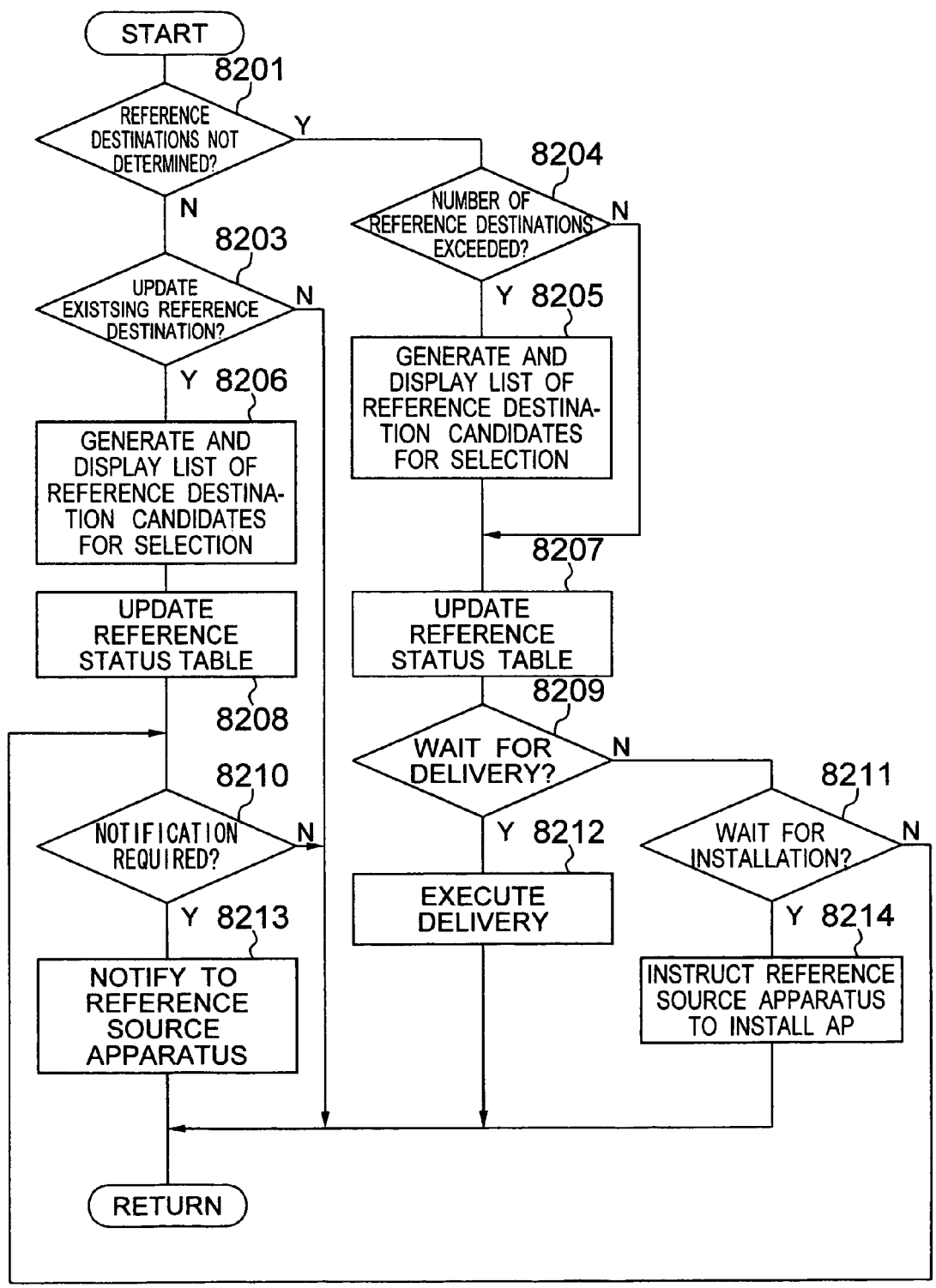
FIG. 11 is a flowchart showing a flow of processing a request in a wait state.

If a record satisfying the condition is detected, the system executes processing for a request in a wait state as shown in FIG. 11 for each record detected.

Step 8201

The system checks whether or not reference destination apparatus ID 1043 of the pertinent record contains space (the reference destination not determined).

Step 8204

If reference destination apparatus ID 1043 contains space, a check is made to determine whether or not the number of apparatus identifiers in delivery destination 322 of delivery package 32 exceeds a value in number of reference destinations 1045 of the pertinent record.

Step 8205

If the value is exceeded, the system requests the delivery manager to select reference destinations to be kept remained. For this purpose, it is only required to display, for example, a user interface screen as shown in FIG. 15. The manager selects desired apparatus identifiers in the screen.

Step 8207

Only the apparatus identifiers selected are set to reference destination apparatus ID 1043 of the pertinent record. If the value is not exceeded in the check of step 8204, delivery destination 322 of delivery package 32 currently in process is set to reference destination apparatus ID 1043 of the pertinent record.

Step 8209

The system checks a content of initial reference action 1047 of the record.

Step 8212

If the content is "wait for delivery", information of a reference destination of which a location has been determined is set to delivery package 32 in the wait state and then delivery package 32 is delivered (if package 32 in the wait state has a plurality of reference destinations and there exists a reference destination waiting for delivery, delivery package 32 is not delivered). Control is then returned.

Step 8211

The system checks to determine whether or not the content is "wait for installation". If the content is other than "wait for installation", processing goes to step 8210.

Step 8214

Figure 9B:
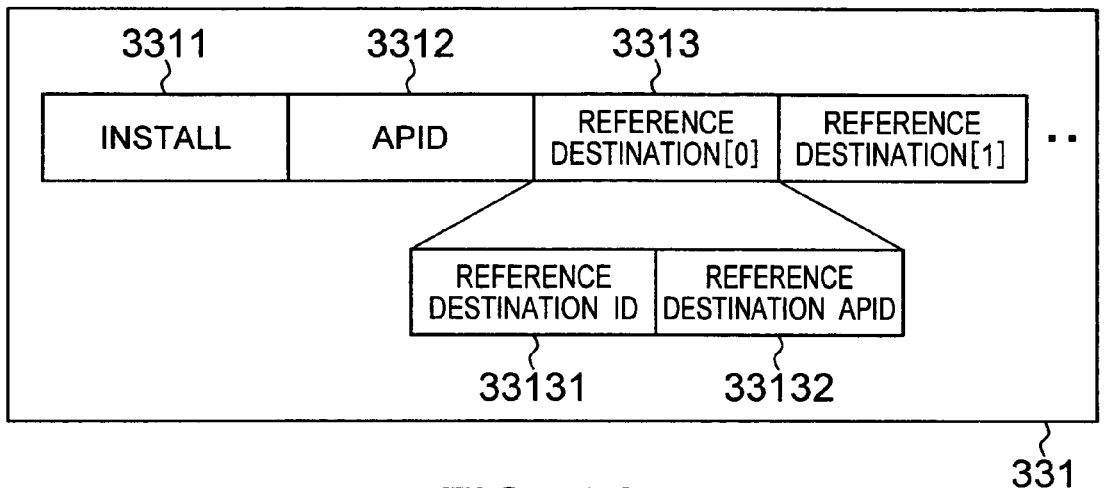

If the content is "wait for installation", an installation instruction is issued to target apparatus 20 in the installation wait state together with a list including AP ID 3312 and reference destination 13 as shown in FIG. 9B (if the application in the wait state has a plurality of reference destinations and there exists a reference destination waiting for delivery, the installation instruction is not issued).

Step 8210

The system checks the content of notification necessity/non-necessity 1046 of the record. If the content is "notification non-necessity", the system takes no action and returns control (namely, terminates the delivery processing).

Step 8213

If notification is necessary, a message is issued according to reference destination setting format 333 of FIG. 9 to target apparatus 20 indicated by reference source apparatus 1041 of the pertinent record.

Step 8203

If reference destination apparatus ID 1043 contains other than space in step 8201, the system requests the delivery manager to determine whether or not the existing item is to be updated. If the manager selects "do not update", the system returns control (terminates the delivery processing).

Step 8206

If the manager selects "update", the system requests the manager to select necessary reference destination apparatus identifiers from the existing reference destination apparatus identifiers and the present delivery destination apparatus identifier.

Step 8208

Only the reference destinations selected are registered to reference destination apparatus ID 1043 of the pertinent record and the control goes to step 8210.

(2) Application Deletion

To delete an application, an instruction to delete the application from particular target apparatus 20 is issued to control command processing 201 of target apparatus 20. In association with the deletion of the application, other applications using the pertinent application are deleted or the reference destinations are changed.

Step 8301

Specifically, a user interface screen is first displayed as shown in FIG. 16 to request the delivery manager to select a combination of an application identifier and a apparatus identifier for an application to be deleted.

Referring next to a flowchart of FIG. 12, description will be given of a procedure to delete an application specified by the manager.

Step 8303

The system accesses reference status table 104 to retrieve therefrom a record including the specified application as its reference destination.

Step 8305

If such a record is detected, the system executes processing for each record as follows.

Step 8307

The system checks the content of reference destination apparatus ID 1043 of the pertinent record to determine whether or not reference is made to a apparatus other than the apparatus on which the application to be deleted is operating.

Step 8309

If reference is made to a apparatus other than the apparatus for the deletion, the system deletes the apparatus identifier as the deletion object from reference destination apparatus ID 1043.

Step 8314

The system checks notification necessity/non-necessity 1046 of the pertinent record.

Step 8315

If notification is necessary, notification 333 (FIG. 9D) of setting of a reference destination for the pertinent application is issued to a target apparatus specified by reference destination apparatus ID 1041 of the record.

Step 8308

If there exists no reference destination other than the reference destination as the deletion object in step 8307, the system requests the delivery manager to determine whether or not the application is to be deleted.

Step 8310

Figure 12:
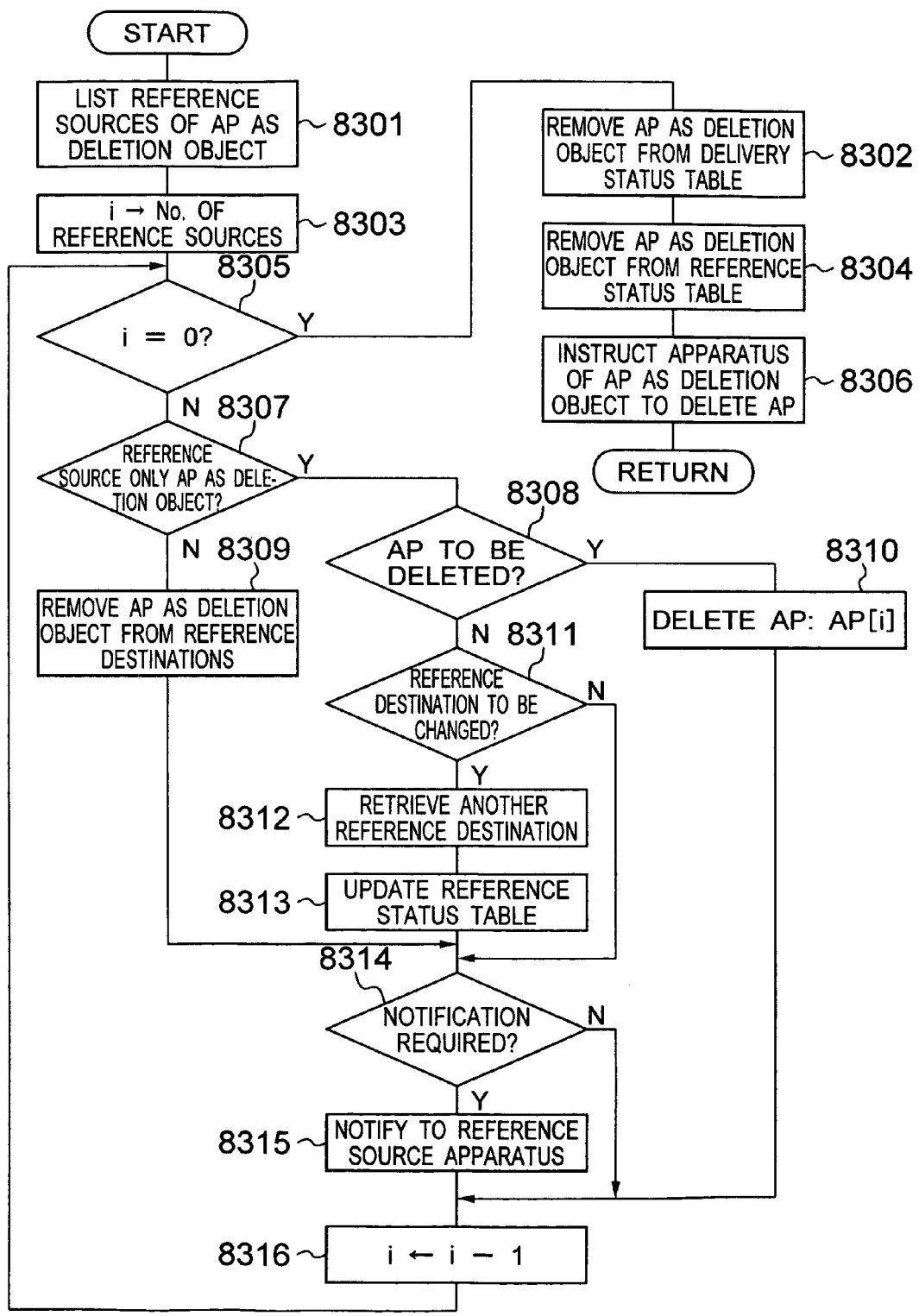
FIG. 12 is a flowchart showing a flow of deleting an application.

If the manager specifies "delete", the deletion of application shown in FIG. 12 (a recursive call) is executed for the application associated with the record.

Step 8311

If the manager specifies "do not delete", the system requests the delivery manager to determine whether or not the reference destination is changed to another apparatus.

Steps 8312 and 8313

If the manager specifies "change" in step 8311, the system checks the reference status table to determine whether or not there are other reference destinations. If this is the case, the system requests the manager to select one of the reference destinations and updates reference destination apparatus ID 1043 of the pertinent record to the content selected by the manager. If such a reference destination is missing, the system sets space to reference destination apparatus ID 1043 of the pertinent record.

Step 8302

When the processing of the reference source application as the object of deletion is finished, the system deletes a record concerning the pertinent application from delivery status table 103.

Step 8304

The system deletes a record concerning the application as the deletion object from reference status table 104.

Step 8306

Figure 9C:
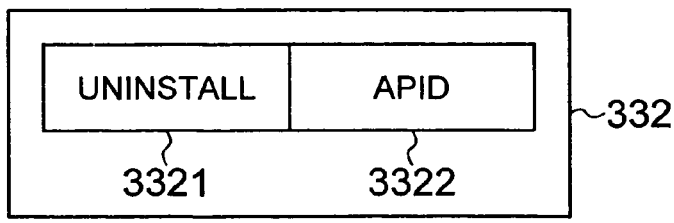
Figure 9D:
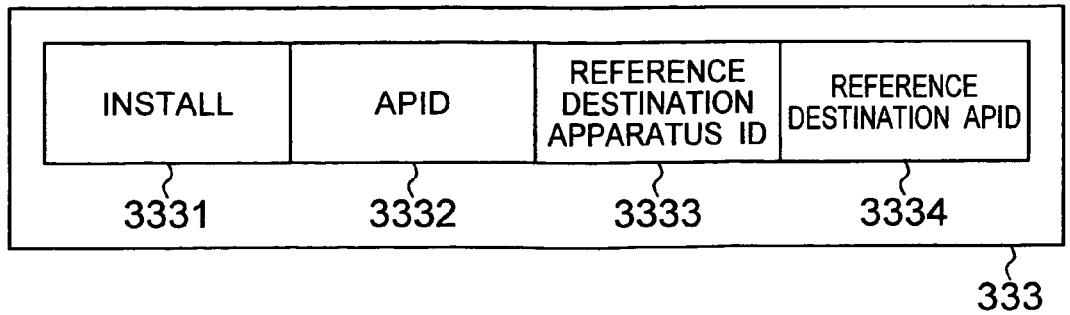

The system instructs target apparatus 20 to which the application as the deletion object is delivered to uninstall or to delete the pertinent application in the format of uninstall 332 shown in FIG. 9C.

(3) Reference Status Display

Using a logic similar to that of the deletion of applications, it is possible to display a list including, for each application, applications referencing the application.

FIG. 17 shows an example of a display screen used in this situation. The screen includes a result display area 9401 displaying a list of applications referenced. In each item listed, an application identifier is indicated outside the parenthesis and a apparatus identifier is enclosed with the parenthesis. For example, APPf(PCe) in a first line indicates that the pertinent application is referenced by an application with a name of APPf on PCe. For a referencing operation in a nested state, it is only necessary to shift display positions. For example, APPd(PCd) in a third line of result display area 9401 is displayed at a position shifted in a horizontal direction. This means that the application as the display object (APPa(Pca) displayed in a title bar) is not directly referenced, but reference is made to APPb(PCe) in a second line.

FIG. 18 is a variation of FIG. 17. A reference tree display area 9501 of FIG. 18 is the same as the display area 9401 of FIG. 17. However, each line of the area 9501 can be selected unlike the area 9401 of FIG. 17. When one (9503) of the lines is selected, detailed information of the line (a content of reference status table 104 for each of the reference sources and destinations) is displayed in a detail display area 9502 as shown in FIG. 18.

(4) Reference Destination Information Supply

As above, "download" is one of the methods to transfer or to pass reference destination information between controller apparatus 10 and target apparatus 20. Information inquiry section 202 issues an inquiry for a reference destination to information supply section 105. In response thereto, information supply section 105 sends the reference destination.

Information communicated between information inquiry section 202 and information supply section 105 is as shown in FIG. 8. For an inquiry 34, a type code 341 indicating "inquiry", a apparatus ID 342 of a request source target apparatus 20, an AP ID 343 as a reference source, and a reference destination AP ID 344 are transmitted. In response thereto, a type code 351 indicating "reply" and a reference destination apparatus ID 352 are transmitted.

Having received the inquiry from target apparatus 20, information supply section 105 accesses reference status table 104 to retrieve therefrom a record matching apparatus ID 342, AP ID 343, and reference destination AP ID 344 contained in inquiry 34 sent from target apparatus 20. Information supply section 105 then sends a content of reference destination apparatus ID 1043 of the record to target apparatus 20.

2. Target Apparatus

Target apparatus 20 primarily executes applications and has two primary functions in this embodiment. Namely, target apparatus 20 conducts (1) processing of a command which is issued from application control section to command processing section 201 and (2) inquiry from information inquiry section 202 to information supply section 105.

To implement these functions, target apparatus 20 includes an application control table 203 and a control command section 201 and an information inquiry section 202 which are implemented, for example, when CPU 41 executes in hardware 40 of FIG. 2 programs stored in memory 42 (FIG. 1).

Application control table 203 includes information necessary to control applications. Table 203 is configured as shown in FIG. 7 and includes, for each application already delivered, an AP ID 2031 of the pertinent application, a processing definition 2032, and a list of reference destinations 2033. Processing definition 2032 and the list of reference destinations 2033 are the same as those of delivery package 32. At delivery, delivery package 32 is copied onto application control table 203.

Command processing section 201 has a function to execute processing of a command issued from controller apparatus 20 to target apparatus 20. Information inquiry section 202 executes processing of an inquiry from target apparatus 20 to controller apparatus 10 to obtain a reference destination of a particular application.

(1) Processing of Command Issued from Application Control Section 102 to Command Processing Section 201

Control command processing section 201 processes application control commands for target apparatus 20 issued (instructed) from controller apparatus 10. The commands include "receive delivery application", "install", "uninstall application beforehand installed", and "set reference destination".

Figure 13:
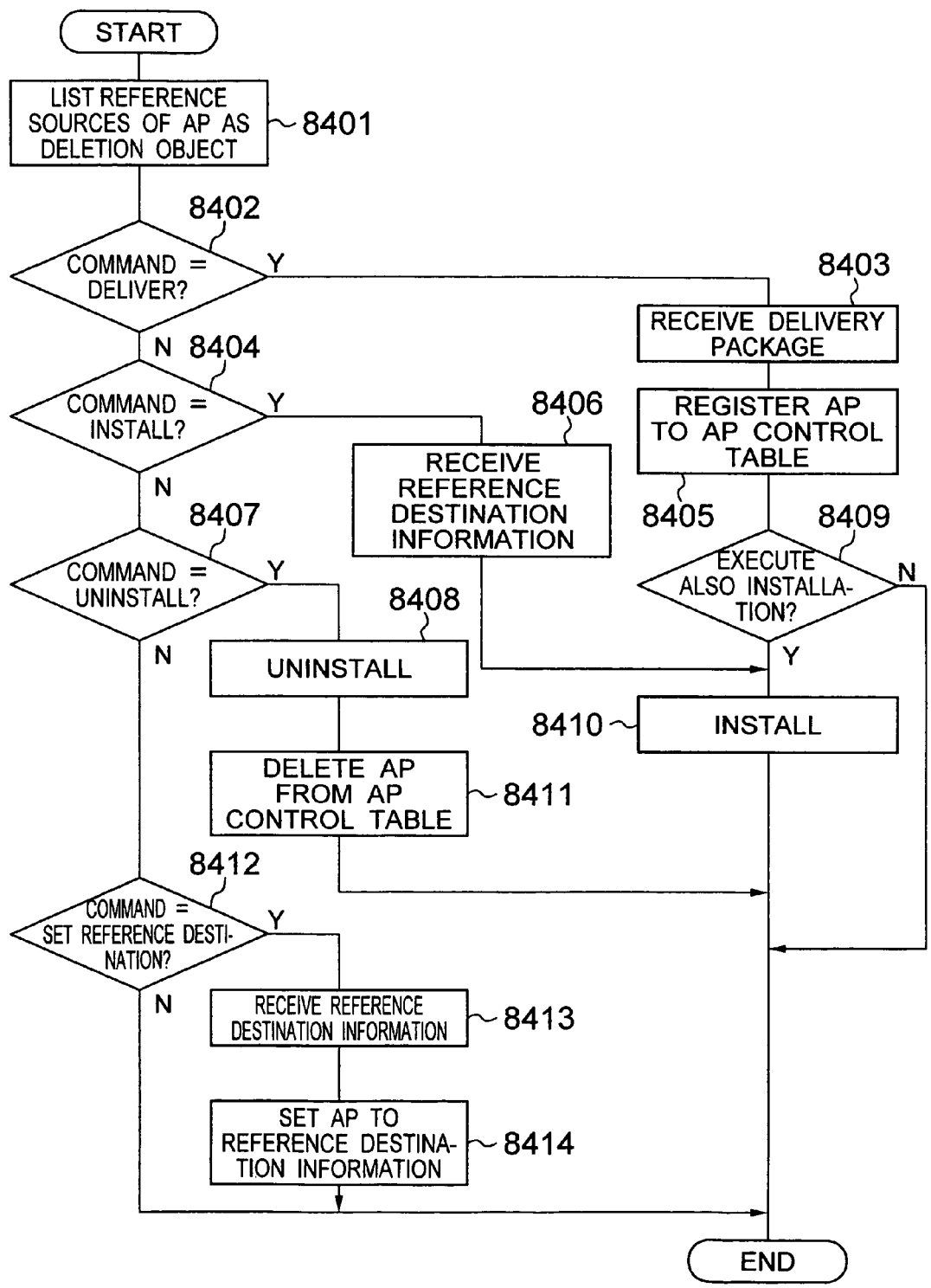
FIG. 13 is a flowchart showing a flow of processing a control command.

Referring now to FIG. 13, description will be given of a flow of processing of control command processing section 201.

Step 8402

Section 201 first checks a type of an instruction (command) from controller apparatus 10.

Step 8403

If the instruction type is delivery 3301, section 201 receives delivery package 32.

Step 8405

Section 201 registers, to application control table 203, contents of AP ID 323, processing definition 325, and list of reference destinations 327 of delivery package 32.

Step 8409

If installation flag 324 of delivery package 32 is "1 (install)", control goes to step 8410.

Step 8410

Section 201 installs an application of delivery package 32 according to a content of the installation item of "processing definition" in delivery package 32.

Step 8404

If the instruction type is "installation", processing goes to step 8410.

Steps 8406 and 8410

Section 201 installs the pertinent application according to installation definition 3131 in processing definition 2032 of the record of the pertinent application in application control table 203.

Steps 8407 and 8408

If the instruction type is "uninstallation", section 201 uninstalls the pertinent application according to a content of uninstallation 3132 in processing definition 2032 of the record of the pertinent application in application control table 203.

Step 8411

Information of the pertinent application is removed from application control table 203.

Steps 8412 and 8413

If the instruction type is "setting of reference destination", section 201 confirms a content of dependent AP ID 3271 of each reference destination 2033 in record 2030 of the pertinent application in application control table 203. Section 201 searches for an item matching reference destination AP ID 3334 received and acquires, if such an item is found, attribute name 3273 of reference destination 2033 detected. A content of reference destination apparatus ID 3333 in reference destination setting command 333 is set as an attribute value.

Step 8414

Section 201 sets attribute name 3273 and attribute values thus acquired to the pertinent application in a method specified by setting method 3272 in processing definition 2932 of record 2030 of the pertinent application in application control table 203.

(2) Inquiry from Information Inquiry Section 202 to Information Supply Section 105

As above, "download" is one method to transmit information of reference destinations of an application from controller apparatus 10 to target apparatus 20. That is, target apparatus 20 inquires controller apparatus 10 of a location of a particular reference application (delivery destination).

Whether or not "download" is to be conducted and when is "download" to be executed (timing) are beforehand defined by delivery package 32 of the pertinent application. For an application already delivered, a copy of the application exists in a list of reference destinations 2033 of application control table 203. According to information above, target apparatus 20 issues an inquiry to controller apparatus 10.

In the inquiry processing, information inquiry section 202 first issues an inquiry to information supply section 105. Data of the inquiry is formatted as shown in inquiry 34 of FIG. 8. That is, identifier code 341, apparatus ID 342 of target apparatus 20, AP ID 343 as an inquiry object, and reference destination AP ID 344 are transmitted to information supply section 105. In response to the inquiry, information supply section 105 sends a reply in the format of reply 35 of FIG. 8 including identifier code 351 indicating the reply and reference destination apparatus ID 352. Reference destination apparatus ID 352 received is passed to the pertinent application in almost the same way as for the reference destination setting described in the command processing above.

The embodiments above lead to advantages as follows.

(1) At Delivery/Installation of Application

To install an application in the prior art, a location of a reference destination application must be inputted. When only one reference destination is present, the function to automatically detect a reference destination and the function to set a reference destination for an application of the present invention remove the requirement to input the location of the reference destination application. Also when there exist a plurality of reference destinations and one of the destinations is to be selected, the selection is carried out beginning at selectable one thereof. This prevents a mistake of selecting a reference destination not actually existing. The present invention therefore mitigates load of human power required to specify a reference destination for an application.

The present invention provides a plurality of methods to pass an application reference destination from the application reference destination control section to the application execution section. The user can therefore appropriately select one of the methods as necessary.

In the first method, the reference destination is passed at delivery of an application. In the second method, after delivery of an application, the application execution section sends a request to the application reference destination control section. In the third method, after delivery of an application, the application execution section directly notifies the reference destination to the application reference destination control section.

The first method is applicable, at delivery of an application, to an initialization of a reference destination for the application. If the reference destination is of an attribute that a content thereof is kept fixed once the attribute is set in the system, the second and third methods are not required. It is only necessary to use the first method for the operation above.

The second method is effective in a situation in which the reference destination is changed. This method is advantageous in that information can be acquired at a point of time suitable for the application execution section.

The third method is effective, like the second method, when the reference destination is changed. This method has an advantage that a change of a reference destination caused by registration, deletion, or the like of an application on the side of the reference destination control section can be immediately notified to the application execution section.

The second and third methods are used to change a reference destination after delivery of an application. However, each thereof has advantageous and disadvantageous aspects. These methods will be hence desirably combined with each other. Specifically, the second method is used to change the reference destination at initiation of the application execution section. Thereafter, the third method is employed during operation of the application execution section. The user can take advantage of both merits of these methods.

The present invention further provides a function to deliver and to install a first application dependent on a second application when a reference destination is determined, for example, because the second application is delivered. By this function, a first application dependent on a second application can be delivered and registered before the second application is delivered.

The delivery according to the determination of a reference destination differs from the installation according thereto in the amount of processing from the determination of a reference destination. That is, in the former, the delivery/installation is executed at determination of the reference destination; in the latter, the installation is conducted immediately after determination of the reference destination. Namely, the latter has a shorter period of wait time from the determination of the reference destination to the completion of installation. When an application of a large size is to be delivered, namely, when the wait time is to be taken into consideration, the latter method will be favorably employed to beforehand deliver the application.

(2) At Deletion of Application

In the prior art, it is troublesome at deletion of an application to detect applications dependent of the pertinent application and it is complicated to change reference destinations of applications dependent on the pertinent application.

The first problem above can be solved by the function to list applications dependent on a particular application in accordance with the present invention.

The second problem can also be removed because after a particular application depending on other applications is automatically detected, reference destinations thereof can be automatically updated only by specifying a reference destination replacing the application to be deleted.

As above, in accordance with the present invention, when a dependency relationship exists between applications, complexity of the control operation including delivery and deletion of applications can be minimized.

The specification and drawings are, accordingly, to be regarded in an illustrative rather than a restrictive sense. it will, however, be evident that various modifications and changes may be made thereto without departing from the broader spirit and scope of the invention as set forth in the claims.

What is claimed is:

1. A system for managing distribution of programs comprising:

a plurality of computers connected to a network; and a program distribution managing device for managing distribution of programs to the computers, wherein said program distribution managing device includes:

means for storing, in a delivery package including a first program to be delivered to and executed on a first computer, information for specifying another of said computers, among said plurality of computers, to which a reference execution program that is employed by said first program to be delivered is delivered, and delivering said delivery package to said first computer, said reference destinations being different from said first computer executing said first program, and wherein said reference execution program is executed on said one or more reference destinations; and said first computer includes means for obtaining said information for specifying another of said computer from said delivery package thus delivered, and transferring said information for specifying another of said computer to said first program thus delivered.

* * * * *